United States Patent
Millett et al.

(10) Patent No.: US 10,734,925 B2
(45) Date of Patent: Aug. 4, 2020

(54) MULTILEVEL DRIVE HALF DC BUS POWER SUPPLIES

(71) Applicant: OTIS ELEVATOR COMPANY, Farmington, CT (US)

(72) Inventors: Steven M. Millett, Plainville, CT (US); Ismail Agirman, Southington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 880 days.

(21) Appl. No.: 15/103,450

(22) PCT Filed: Dec. 18, 2013

(86) PCT No.: PCT/US2013/076181
§ 371 (c)(1),
(2) Date: Jun. 10, 2016

(87) PCT Pub. No.: WO2015/094233
PCT Pub. Date: Jun. 25, 2015

(65) Prior Publication Data
US 2016/0308474 A1 Oct. 20, 2016

(51) Int. Cl.
*H02P 9/04* (2006.01)
*H02P 4/00* (2006.01)
(Continued)

(52) U.S. Cl.
CPC ............... *H02P 4/00* (2013.01); *B66B 1/302* (2013.01); *B66B 1/308* (2013.01); *B66B 11/043* (2013.01);
(Continued)

(58) Field of Classification Search
CPC ........ B66B 11/043; B66B 1/302; B66B 1/308
See application file for complete search history.

(56) References Cited

U.S. PATENT DOCUMENTS 6,476,571 B1   11/2002   Sasaki
7,227,323 B2    6/2007   Yamada et al.
(Continued)

FOREIGN PATENT DOCUMENTS

CN     1574604 A    2/2005
CN   101218738 A    7/2008
(Continued)

OTHER PUBLICATIONS

International Search Report and Written Opinion for application PCT/US2013/076181; dated Sep. 23, 2014, 11 pages.
(Continued)

*Primary Examiner* — Muhammad S Islam
(74) *Attorney, Agent, or Firm* — Cantor Colburn LLP

(57) ABSTRACT

A regenerative drive (30) and method for providing power from such to at least one auxiliary power supply (41, 43) is disclosed. The drive may include a converter (32) and an inverter (34) connected by a DC bus (33), and a controller (54) configured to apply at least one of unipolar modulation and bipolar modulation to the converter (32) and the inverter (34), and to provide about half of the output voltage across the upper portion (130) of the DC bus (33) and about half of the output voltage across the lower portion (136) of the DC bus (33), when the upper and lower portions (130, 136) of the DC bus (33) are unevenly loaded. A first auxiliary power supply (41) may be connected to one of the upper and lower portions (130, 136) of the DC bus (33) and may receive power from the multilevel regenerative drive (30).

18 Claims, 16 Drawing Sheets

(51) Int. Cl.
  *B66B 1/30*     (2006.01)
  *H02M 5/45*     (2006.01)
  *H02M 1/14*     (2006.01)
  *B66B 11/04*    (2006.01)
  *H02P 6/08*     (2016.01)
  *H02M 1/00*     (2006.01)

(52) U.S. Cl.
  CPC ........... *H02M 1/14* (2013.01); *H02M 5/4505* (2013.01); *H02P 6/085* (2013.01); *H02M 2001/0048* (2013.01); *Y02B 70/1491* (2013.01)

(56) References Cited

U.S. PATENT DOCUMENTS

| | | |
|---|---|---|
| 2006/0250107 A1 | 11/2006 | Jadric et al. |
| 2007/0013339 A1 | 1/2007 | Ma et al. |
| 2011/0247900 A1 | 10/2011 | Blasko et al. |

FOREIGN PATENT DOCUMENTS

| | | | |
|---|---|---|---|
| EP | 1995860 A2 * | 11/2008 | ............ H02M 1/32 |
| EP | 1995860 A2 | 11/2008 | |
| EP | 2500309 A1 | 2/2012 | |
| JP | 2004307133 A | 11/2004 | |
| KR | 1020130019897 A | 2/2013 | |

OTHER PUBLICATIONS

European Search Report for application EP 13899429.8, dated Aug. 14, 2017, 8 pages.
Chinese First Office Action and Search Report for application CN 201380081735.5, dated Dec. 18, 2013, 12 pages.
Korean Office Action for application KR 10-2016-7018921, dated Dec. 6, 2019, 10 pages.

* cited by examiner

Triangle comparison within the "PWM Modulator"

Current distortion due to dead-time effects

Current with dead-time compensation

NPC (left) and T-type (right) $\Delta T_{jc}$ with state-of-the-art NP-balancing PWM NPC $\Delta T_{jc}$      T-type $\Delta T_{jc}$ Current waveform and device j-c temperature rise with proposed thermal & NP-balancing PWM

MULTILEVEL DRIVE HALF DC BUS POWER SUPPLIES

FIELD OF THE DISCLOSURE

The present disclosure relates generally to elevator systems and, more particularly, to a control system and method for an elevator system.

BACKGROUND OF THE DISCLOSURE

Elevator systems typically include an elevator car positioned in a hoistway for carrying passengers and loads between various floors of a building. Elevator systems also include motors, which provide the requisite thrust force to move the elevator cars within the hoistways. Regenerative drives may be used to achieve desired elevator car movement and to generate electricity.

Regenerative drives may typically include a converter on the input or power utility grid side and an inverter on the motor side. In the design of a regenerative drive, power demand of the inverter is matched by an appropriate power capability of the converter. Power demands for operating elevators range from positive to negative. With positive power demands, externally generated power, such as power from a power utility grid, is used. With negative power demands, the load in the elevator drives the motor so it produces electricity as a generator. Use of the motor to produce electricity as a generator is commonly called regeneration. Regenerative drives may operate on a three-phase power input. In addition, regenerative drives may be multilevel with a multilevel converter and a multilevel inverter.

Management of acoustic noise, efficiency, neutral point stability and thermal balancing in the regenerative drive may be challenging. Accordingly, there exists a need for a control system and method that deliver beneficial results in acoustic noise, efficiency, neutral point stability and thermal balancing.

SUMMARY OF THE DISCLOSURE

An exemplary embodiment of the present disclosure is directed to a method for providing power from a multilevel regenerative drive to at least one auxiliary power supply. The multilevel regenerative drive may include a converter operatively connected to an inverter through a DC bus having an upper portion defined by a positive terminal and a neutral point and a lower portion defined by the neutral point and a negative terminal. The inverter may be coupled to a motor. The DC bus has an output voltage. The method may comprise generating duty cycle signals for upper and lower arms of each phase of the motor that maintain a neutral point current at about zero amperes at the neutral point, and providing about half of the output voltage across the upper portion of the DC bus and about half of the output voltage across the lower portion of the DC bus, when the upper and lower portions of the DC bus are unevenly loaded. A first auxiliary power supply may be connected to one of the upper and lower portions of the DC bus and may receive power from the multilevel regenerative drive.

In a refinement, a second auxiliary power supply may be connected to the other of the upper and lower portions of the DC bus and may receive power from the multilevel regenerative drive.

In another refinement, the method may further comprise applying at least one of unipolar modulation and bipolar modulation to the converter, and applying at least one of unipolar modulation and bipolar modulation to the inverter. In a further refinement, the applying at least one of unipolar modulation and bipolar modulation to the converter comprises applying unipolar modulation to the converter. In yet a further refinement, the applying at least one of unipolar modulation and bipolar modulation to the inverter may comprise applying bipolar modulation to the inverter. Alternatively, in another refinement, the applying at least one of unipolar modulation and bipolar modulation to the inverter may comprise applying bipolar modulation to the inverter during a first period, and applying unipolar modulation to the inverter during a second period, wherein the first period may precede or follow the second period. Alternatively, in another refinement, the applying at least one of unipolar modulation and bipolar modulation to the inverter may comprise applying bipolar modulation to the inverter during acceleration and applying unipolar modulation to the inverter during constant velocity.

In a refinement, the applying at least one of unipolar modulation and bipolar modulation to the converter may comprise applying bipolar modulation to the converter.

Another exemplary embodiment is directed to a system for providing power from a mechanical system having a motor to at least one auxiliary power supply. The system may comprise a converter operatively connected to a power source, a DC bus, an inverter operatively connected to the motor of the mechanical system, and at least one controller in communication with the converter and the inverter. The converter may have a plurality of transistors and diodes in selective communication with the power source. The DC bus may have an upper portion defined by a positive terminal and a neutral point, and a lower portion defined by the neutral point and a negative terminal. The inverter and the converter may be operatively connected through the DC bus. The inverter may have a plurality of transistors and diodes in selective communication with the motor. The at least one controller may be configured to provide about half of the output voltage across the upper portion of the DC bus and about half of the output voltage across the lower portion of the DC bus when the upper and lower portions of the DC bus are unevenly loaded, wherein a first auxiliary power supply may be connected to and may receive power from one of the upper and lower portions of the DC bus.

In a refinement, a second auxiliary power supply may be connected to and may receive power from the other of the upper and lower portions of the DC bus. In another refinement, the at least one controller may be further configured to apply at least one of unipolar modulation and bipolar modulation to the converter and the inverter. In another refinement, the at least one controller may be further configured to apply unipolar modulation to the converter and apply bipolar modulation to the inverter. In another refinement, the at least one controller may be further configured to apply unipolar modulation to the converter, and apply both unipolar and bipolar modulation to the inverter. In another refinement, the at least one controller may be further configured to apply bipolar modulation to the converter and apply bipolar modulation to the inverter. In another refinement, the converter and the inverter may have a neutral-point-clamped, T-type, or reverse blocking insulated gate bipolar transistor based topology. In another refinement, the mechanical system may be an elevator system.

Another exemplary embodiment is directed to an elevator system connected to at least one auxiliary power supply. The elevator system may comprise an elevator car disposed in a hoistway, a motor operatively connected to the elevator car, a power source operatively connected to the motor, a converter operatively connected to the power source, a DC bus, an inverter operatively connected to the motor, and at least one controller in communication with the converter and the inverter. The motor may generate a thrust force to move the elevator car within the hoistway. The power source may supply power to the motor. The converter may have a plurality of transistors and diodes in selective communication with the power source. The DC bus may have an upper portion defined by a positive terminal and a neutral point, and a lower portion defined by the neutral point and a negative terminal. The inverter and the converter may be operatively connected through the DC bus. The inverter may have a plurality of transistors and diodes in selective communication with the motor. The at least one controller may be configured to selectively apply pulse width modulation to the converter and the inverter in at least one of a unipolar mode and a bipolar mode. The at least one controller may be further configured to provide about half of the output voltage across the upper portion of the DC bus and about half of the output voltage across the lower portion of the DC bus, when the upper and lower portions of the DC bus are unevenly loaded. A first auxiliary power supply may be connected to and receive power from one of the upper and lower portions of the DC bus.

In a refinement, a second auxiliary power supply may be connected to and receive power from the other of the upper and lower portions of the DC bus. In another refinement, the controller may be further configured to apply unipolar modulation to the converter, while simultaneously applying bipolar modulation to the inverter. In another refinement, the at least one controller may be further configured to apply unipolar modulation to the converter, while simultaneously applying bipolar modulation to the inverter during acceleration of the elevator car and unipolar modulation to the inverter during constant speed.

Although various features are disclosed in relation to specific exemplary embodiments, it is understood that the various features may be combined with each other, or used alone, with any of the various exemplary embodiments without departing from the scope of the disclosure.

These and other aspects and features will become more readily apparent upon reading the following detailed description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, and the intention is to cover all modifications, alternative constructions, and equivalents along within the spirit and scope of the present disclosure.

DETAILED DESCRIPTION

Figure 1:
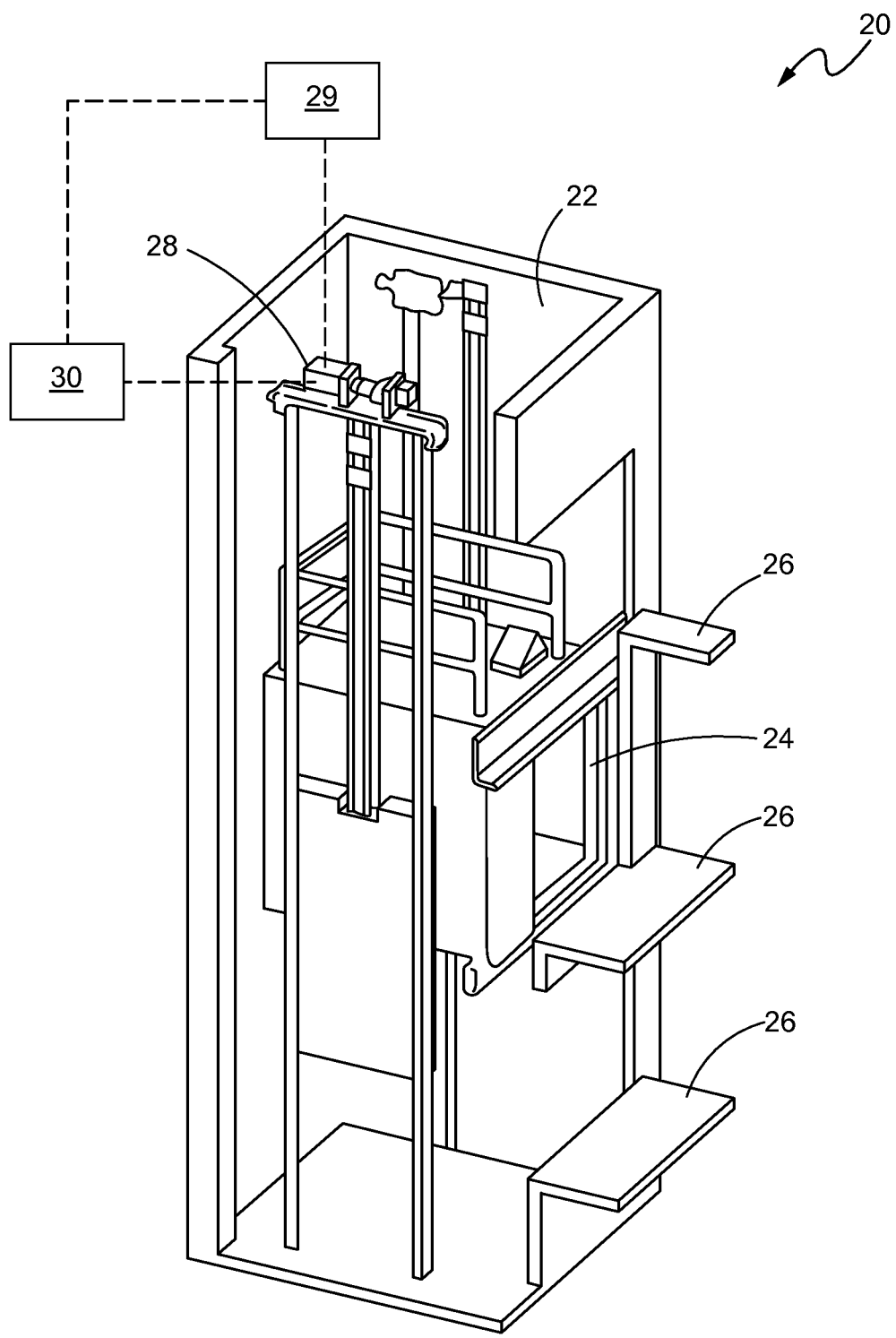
FIG. 1 is a schematic representation of an elevator system, according to an exemplary embodiment of the present disclosure.

Referring now to the drawings, and with specific reference to FIG. 1, a schematic diagram of an elevator system 20 is provided, according to an exemplary embodiment. It is to be understood that the version of the elevator system 20 shown in FIG. 1 is for illustrative purposes only and to assist in disclosing various embodiments of the invention. As is understood by a person skilled in the art, FIG. 1 does not depict all of the components of an exemplary elevator system, nor are the depicted features necessarily included in all elevator systems.

As shown in FIG. 1, the elevator system 20 may reside fully or partially in a hoistway 22 that is vertically disposed within a building. The hoistway 22 may provide a vertical path through which an elevator car 24 may travel between floors or landings 26 of the building. A motor 28, or other prime mover, may be operatively connected to the elevator car 24 in order to generate a thrust force to move the elevator car 24 within the hoistway 22. The motor 28 may also be referred to as a machine, or in alternate configurations, the motor 28 may be part of a machine that is used to move an elevator car 24.

Figure 2:
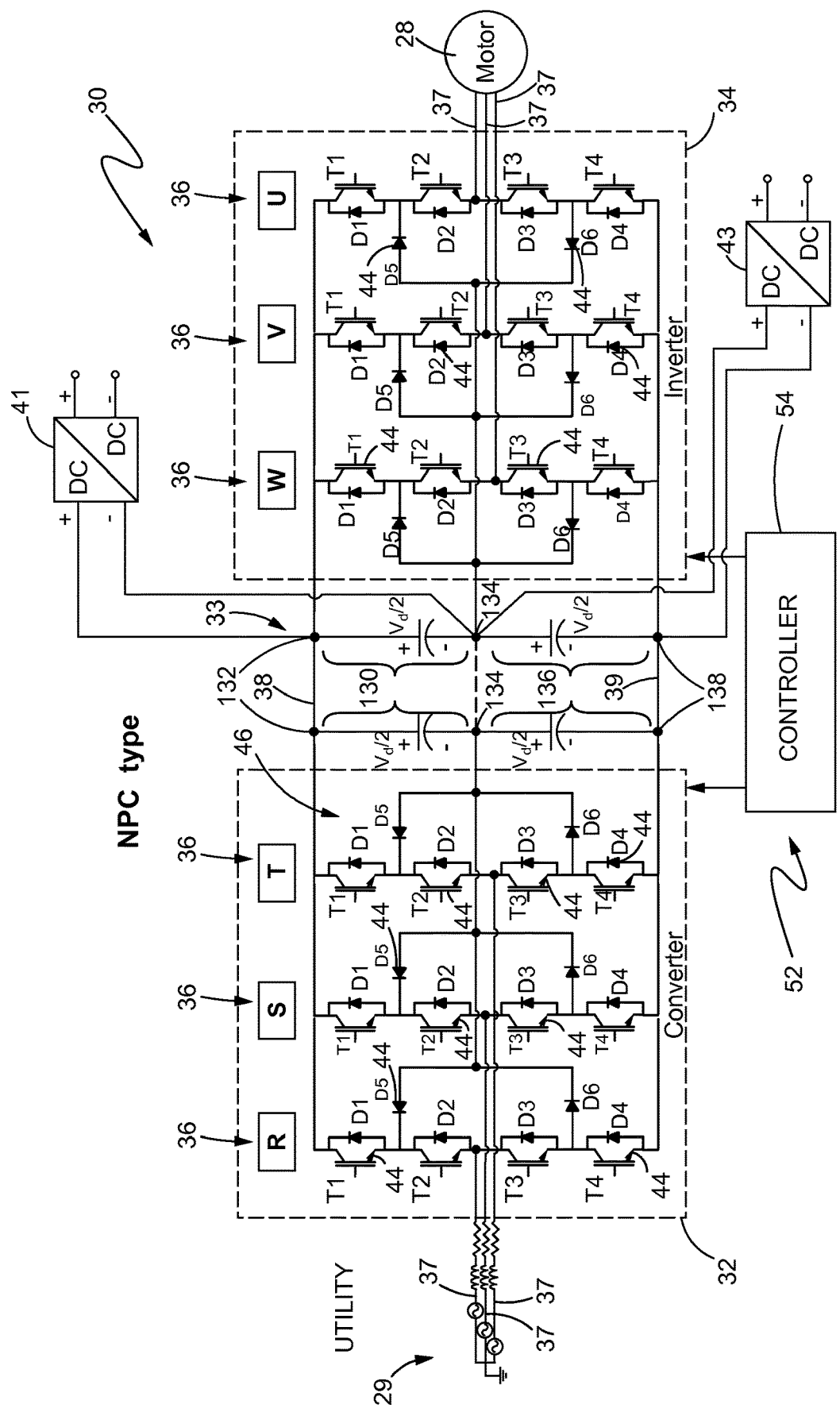
FIG. 2 is a schematic representation of a neutral-point-clamped (NPC) regenerative drive for the elevator system of FIG. 1, according to an exemplary embodiment of the present disclosure.

A power source 29 (as shown in FIG. 2) may be operatively connected to the motor 28 in order to supply power to the motor. The power source 29 may be externally generated power, such as from a power utility grid. The motor 28 and power source 29 may each be three-phase. In addition, a regenerative drive 30 may be coupled to the motor 28 and power source 29 in order to operate the motor 28 to achieve the desired elevator car movement. It should be noted that while power source 29 is shown as a three-phase AC power supply, the regenerative drive 30 may be adapted to receive power from any type of power source, including a single phase AC power source and a DC power source.

Referring now to FIGS. 2-7 with continued reference to FIG. 1, the regenerative drive 30 may include a converter 32 on the input or power utility grid side and an inverter 34 on the motor side. More specifically, the converter 32 may be operatively connected to the power source 29 and may have a phase-leg 36 for each phase 37 of the power source 29. The inverter 34 may be operatively connected to motor 28 and may have a phase-leg 36 for each phase 37 of the motor 28. In this example, since the power source 29 and motor 28 are each three phase, the converter 32 and the inverter 34 each have three phase-legs 36. In addition, the converter 32 and the inverter 34 may be connected to each other by a direct current (DC) bus 33. More specifically, the DC bus 33 may comprise, and the converter 32 and the inverter 34 may be connected to each other by way of, an upper DC bus 38 and a lower DC bus 39. A neutral point 40 of the converter 32 may or may not be connected to a neutral point 42 of the inverter 34. The DC bus 33 may be thought of as having an upper portion 130 and a lower portion 136. The upper portion 130 may be defined by a positive terminal 132 and a neutral point 134 and the lower portion 136 may be defined by the neutral point 134 and a negative terminal 138 of the DC bus 33.

Furthermore, each phase-leg R, S, T of the converter 32 may include a plurality of power transistor circuits 44 in selective communication with each phase 37 of the power source 29, and each phase-leg W, V, U of the inverter 34 may include a plurality of power transistor circuits 44 in selective communication with each phase 37 of the motor 28. More specifically, the plurality of power transistor circuits 44 in the converter 32 and inverter 32 may include a plurality of transistors T1-T4 and a plurality of diodes D1-D6. Each transistor T1-T4 may be, for example, an insulated gate bipolar transistor (IGBT). The regenerative drive 30 may be a multilevel drive having a multilevel converter 32 and a multilevel inverter 34. In this example, the regenerative drive 30 may be a three-level drive with a three-level converter 32 and a three-level inverter 34. More specifically, each phase-leg 36 of the converter 32 and inverter 34 may output three levels of voltage, e.g., a positive voltage, a neutral point voltage, and a negative voltage.

Figure 3:
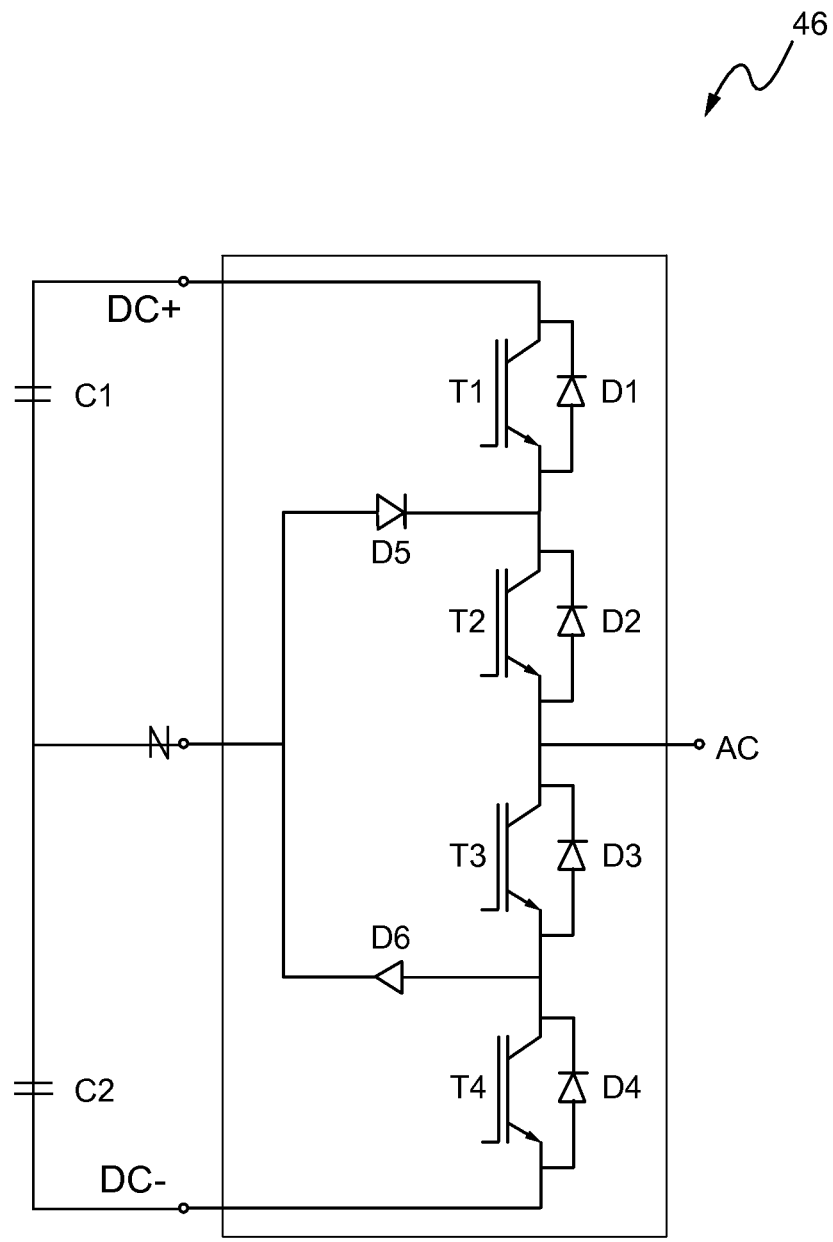
FIG. 3 is a schematic representation of a phase leg of an inverter or converter of the regenerative drive of FIG. 2, according to an exemplary embodiment of the present disclosure.

As shown best in FIGS. 2 and 3, each phase-leg 36 of the converter 32 and inverter 34 may have a neutral-point-clamped (NPC-type) topology 46. In the NPC topology, each phase leg may include clamping diodes D5, D6. In an embodiment shown best in FIGS. 4 and 5, each phase-leg 36 of the converter 32 and inverter 34 may have a T-type topology 48. In an embodiment shown best in FIGS. 6 and 7, each phase-leg 36 of the converter 32 and inverter 34 may have an AT NPC-type or reverse blocking IGBT based topology 50. In these embodiments, each phase-leg 36 may include four IGBTs T1-T4.

A control system 52 may be used to control the converter 32 and inverter 34. The control system 52 may comprise a controller 54 operatively connected to the gate or base of the transistors T1-T4 in the power transistor circuits 44 of the converter 32 and inverter 34. For example, the controller 54 may be connected to a driver circuit, which may send logic signals to each of the IGBTs T1-T4 in the converter 32 and inverter 34. The controller 54 may be programmed to apply pulse width modulation (PWM) to produce gating pulses so as to periodically switch the transistors T1-T4 of the converter 32 and inverter 34. PWM is a modulation technique that may be used to provide: DC power from the converter 32 to the upper DC bus 38 and the lower DC bus 39; 3-phase AC power to the motor 28 from the inverter 34; and, regeneratively, DC power from the inverter 34 to the upper DC bus 38 and the lower DC bus 39, and 3-phase AC power to the power source 29. Although the controller 54 is shown and described as applying to both the converter 32 and inverter 34, it is to be understood that there may be two separate controllers instead of one controller, e.g., one controller for the converter 32 and one controller for the inverter 34. The controller 54 may comprise a processor (e.g., "computer processor") or processor-based device that may include or be associated with a non-transitory computer readable storage medium having stored thereon computer-executable instructions. It is understood that the control system 52 and controller 54 may include other hardware, software, firmware, or combinations thereof.

With a multilevel regenerative drive 30, e.g., the three-level converter 32 and three-level inverter 34, the controller 54 may apply PWM in two modes: unipolar and bipolar. Unipolar modulation comprises switching of only one pair of IGBTs, T1 and T3, or T2 and T4, during one PWM cycle, when applied to a phase-leg 36 of the converter 32 or inverter 34. With unipolar modulation, an output alternative current (AC) voltage may range either from a neutral potential to a positive potential or from the neutral potential to a negative potential. Unipolar modulation may provide efficiency and acoustic performance benefits.

Figure 5:
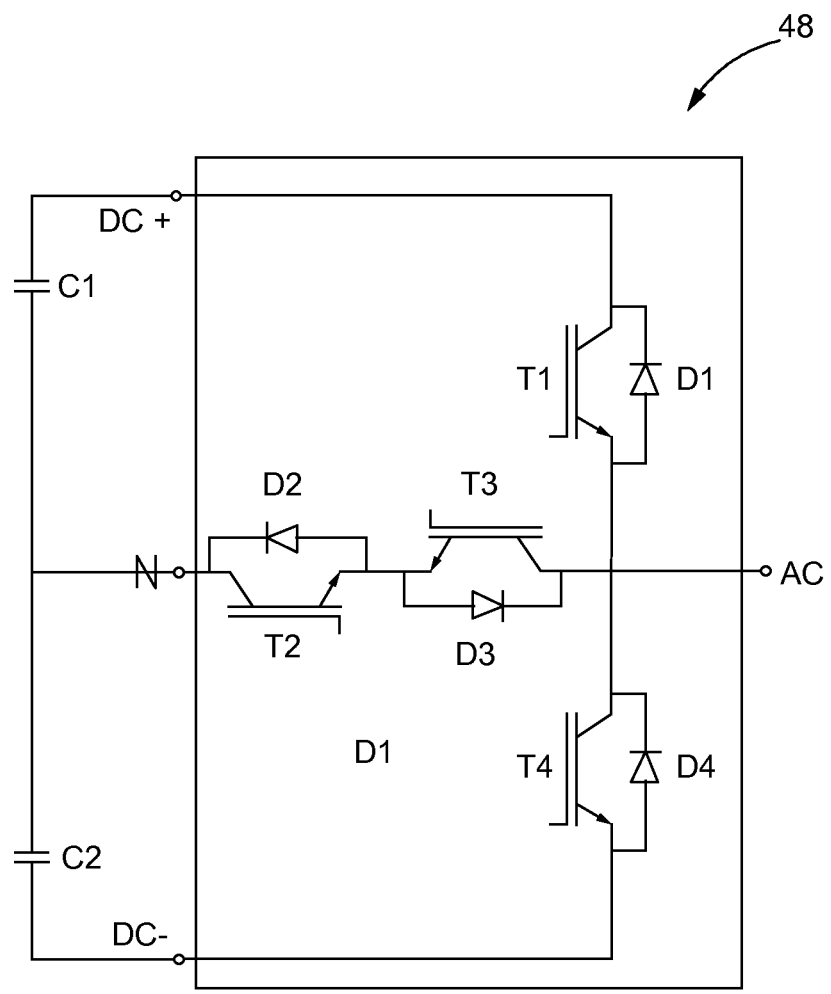
FIG. 5 is a schematic representation of a phase leg of an inverter or converter of the regenerative drive of FIG. 4, according to an exemplary embodiment of the present disclosure.
Figure 7:
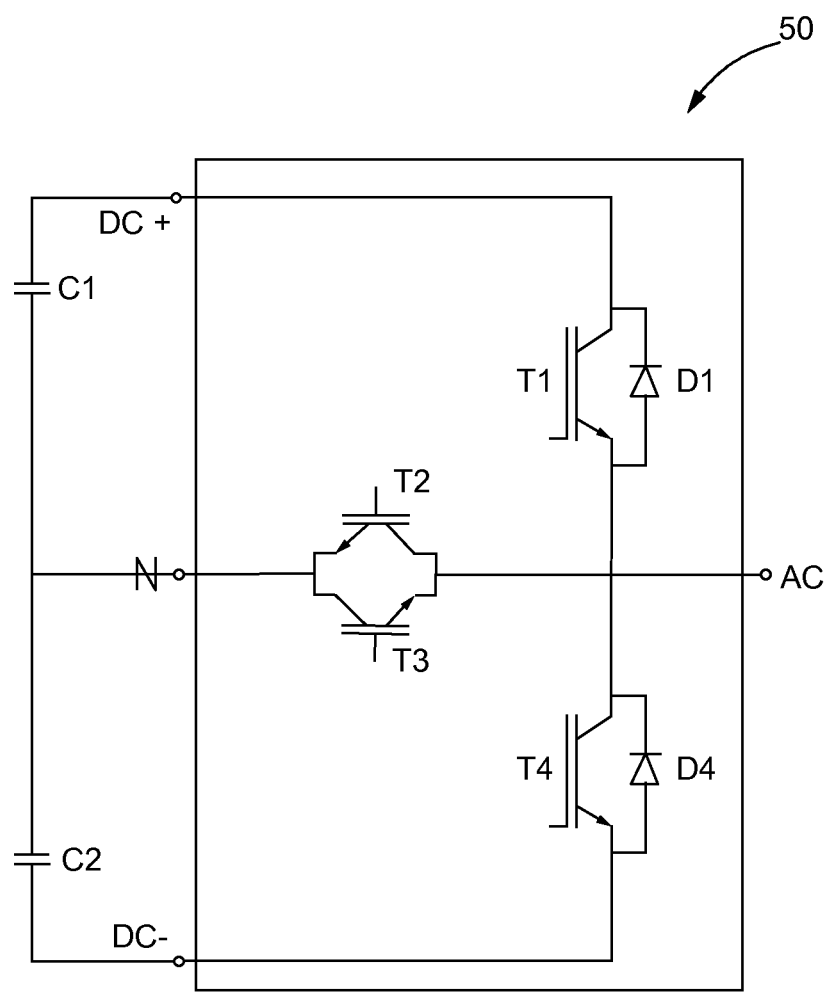
FIG. 7 is a schematic representation of a phase leg of an inverter or converter of the regenerative drive of FIG. 6, according to an exemplary embodiment of the present disclosure.
Figure 8:
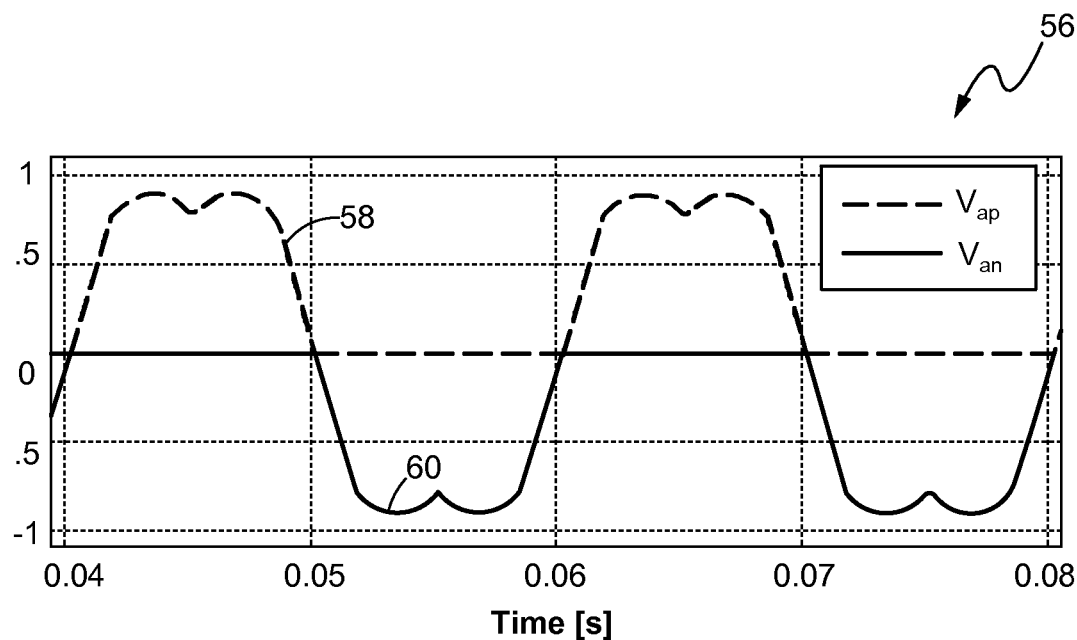
FIG. 8 is a graph of a unipolar modulation waveform of a phase-leg of FIG. 3, 5, or 7 according to various exemplary embodiments of the invention.

FIG. 8 illustrates a resulting unipolar modulation waveform 56 applied to the inverter/converter phase-legs of FIG. 3, 5, or 7. IGBTs T1 and T3 may be utilized for synthesizing the positive part of the AC voltage while T2 is on and T4 is off, and IGBTs T2 and T4 may be utilized for synthesizing the negative part of the AC voltage while T1 is off and T3 is on. As shown in the unipolar modulation waveform 56, a positive part 58 controls the switching of IGBTs T1 and T3, while a negative part 60 controls the switching of IGBTs T2 and T4.

For unipolar modulation, when one pair of IGBTs, T1 and T3, is switching, the other pair of IGBTs, T2 and T4, is not switching, and vice versa. As shown in the unipolar modulation waveform 56, when the positive modulation waveform 58 (switching of IGBTs T1 and T3) is nonzero, the negative modulation waveform 60 (switching of IGBTs T2 and T4) is zero. Similarly, when the negative modulation waveform 60 (switching of IGBTs T2 and T4) is nonzero, the positive modulation waveform 58 (switching of IGBTs T1 and T3) is zero.

Bipolar modulation comprises switching of all IGBTs T1-T4 during one PWM cycle, when applied to a phase-leg 36 of the converter 32 or inverter 34. Switching all four devices T1-T4 during one PWM cycle may achieve neutral point regulation. With bipolar modulation, the output AC voltage may range from a positive potential to a negative potential. Bipolar modulation may provide neutral point stability and thermal balancing benefits. Neutral point control may result in improved ride quality of the elevator system 20, while improved thermal balancing across the devices may result in a longer part life.

Figure 9:
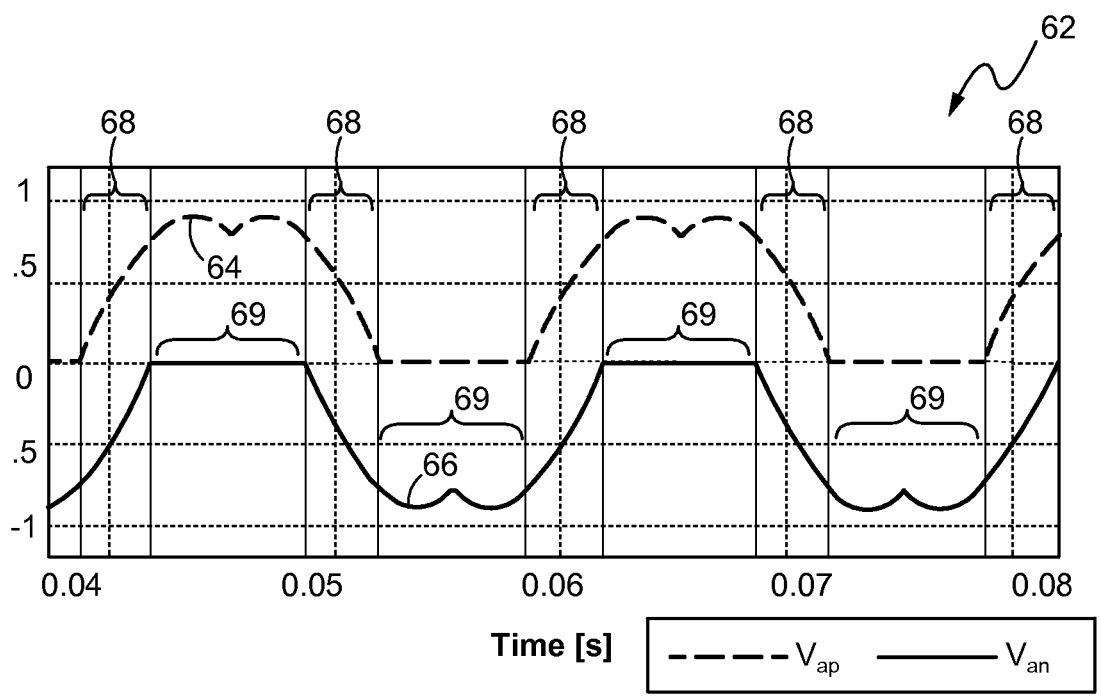
FIG. 9 is a graph of a bipolar modulation waveform of a phase-leg of FIG. 3, 5, or 7 according to various exemplary embodiments of the invention.

FIG. 9 illustrates a resulting bipolar modulation waveform 62 applied to the inverter/converter phase-legs of FIG. 3, 5, or 7. IGBTs T1 and T3 may be utilized for synthesizing the positive part of the AC voltage while T2 is on and T4 is off, and IGBTs T2 and T4 may be utilized for synthesizing the negative part of the AC voltage while T1 is off and T3 is on. As shown in the bipolar modulation waveform 62, a positive part 64 controls the switching of IGBTs T1 and T3, while a negative part 66 controls the switching of IGBTs T2 and T4.

For bipolar modulation, in areas 68 of the modulation waveform 62, all four IGBTs T1-T4 may switch during one PWM cycle. Both the positive modulation waveform 64 (switching of IGBTs T1 and T3) and the negative modulation waveform 66 (switching of IGBTs T2 and T4) are nonzero in areas 68. In areas 69 of the bipolar modulation waveform 62, one pair of devices (either IGBTs T1 and T3, or IGBTs T2 and T4) may switch during one PWM cycle. The same fundamental component of output voltage can be achieved using bipolar and unipolar modulation techniques.

The controller 54 may be configured to apply unipolar and/or bipolar modulation to every phase-leg 36 of the converter 32 and to simultaneously apply unipolar and/or bipolar modulation to every phase-leg 36 of the inverter 34. For example, the controller 54 may apply unipolar modulation to the converter 32 and bipolar modulation to the inverter 34. In so doing, the elevator system 20 may have an enhanced acoustic performance and efficiency in the converter 32, while achieving increased neutral point control and thermal balancing in the inverter 34.

In another example, the controller 54 may apply unipolar modulation to the converter 32 and a mixture of bipolar modulation and unipolar modulation to the inverter 34. For example, the controller 54 may apply bipolar modulation to the inverter 34 during acceleration of the elevator car 24. Acceleration may include positive acceleration and negative acceleration (deceleration). When the elevator car 24 is moving at constant velocity, then the controller 54 may apply unipolar modulation to the inverter 34. In so doing, the elevator system 20 may have an enhanced acoustic performance and efficiency in the converter 32, while achieving increased neutral point control and thermal balancing in the inverter 34. Furthermore, during constant velocity of the elevator car 24, efficiency may increase and acoustic noise may decrease due to the application of unipolar modulation to the inverter 34.

Furthermore, the controller 54 may be programmed to apply bipolar modulation to the inverter 34 during acceleration of the elevator car 24 within a certain range, such as, a range of zero to a predetermined rated speed. The predetermined rated speed may be approximately seventy-five percent (75%) of the rated speed, although other values may certainly be used. The controller 54 may also be programmed to apply unipolar modulation to the inverter 34 during acceleration of the elevator car 24 within a range of the predetermined rated speed (e.g., 75% of the rated speed) to the rated or constant speed and throughout movement of the elevator car 24 at the constant speed.

In another example, the controller 54 may apply bipolar modulation to the converter 32 and bipolar modulation to the inverter 34. This configuration may provide enhanced neutral point control for both the converter 32 and the inverter 34, which results in improved ride quality performance of the elevator system 20. Furthermore, there may be improved thermal balancing across the IGBTs T1-T4 due to the application of bipolar modulation, which results in an improved size selection for the IGBTs.

It is to be understood that other configurations, such as, without limitation, unipolar modulation in the converter 32 and unipolar modulation in the inverter 34, bipolar modulation in the converter 32 and unipolar modulation in the inverter 32, mixed unipolar and bipolar modulation in the converter 32 and mixed unipolar and bipolar modulation in the inverter 32, may certainly be used.

Figure 10:
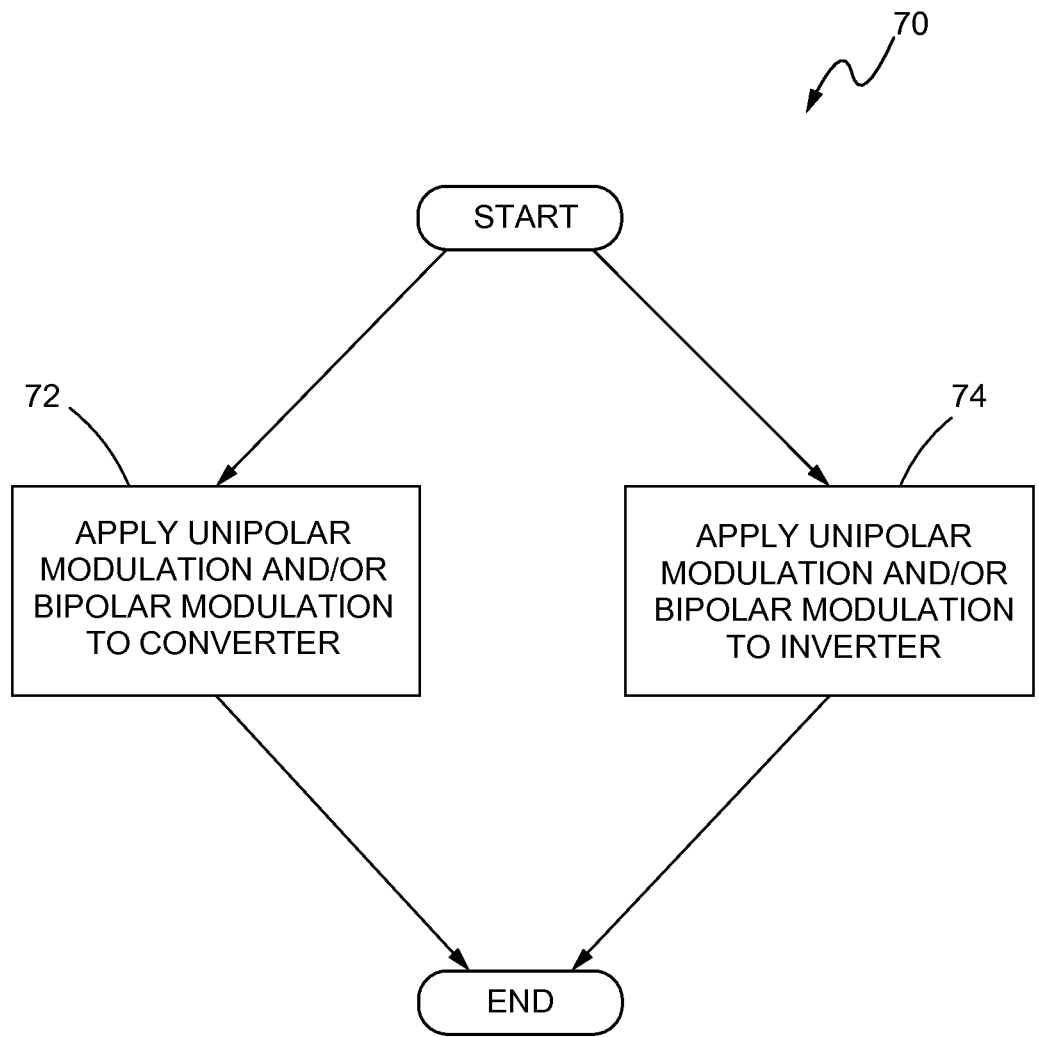
FIG. 10 is a flowchart illustrating an exemplary process for controlling a multilevel regenerative drive, according to an exemplary embodiment of the present disclosure.

Turning now to FIG. 10, with continued reference to FIGS. 1-9, an exemplary process 70 for controlling the multilevel regenerative drive 30 is shown. The regenerative drive 30 may include the three-level converter 32 and the three-level inverter 34. At block 72, unipolar and/or bipolar modulation may be applied to the converter 32. Simultaneously, at block 74, unipolar and/or bipolar modulation may be applied to the inverter 34.

Figure 11:
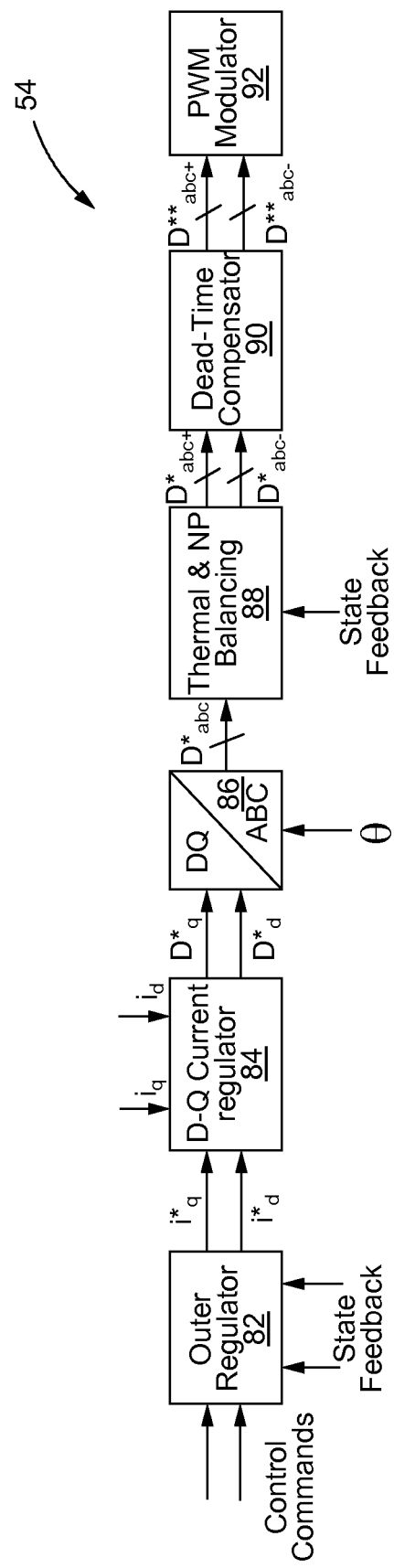
FIG. 11 is a schematic representation of a controller for the inverter or converter of the regenerative drives of FIGS. 2, 4 and 6, according to an exemplary embodiment of the present disclosure.

As shown in FIG. 11, the controller 54 may include modules 82, 84, 86, 88, 90, 92 in communication with each other. More specifically, an outer regulator 82 may receive control command signals and state feedback signals to generate direct quadrature (D-Q) current command signals $i^*_q$, $i^*_d$. The control command signals may be real and reactive power, direct current (DC) link voltage, and the like. The state feedback signals may be real and reactive power, DC link voltage, and the like.

A D-Q current regulator 84 may receive the D-Q current command signals $i^*_q$, $i^*_d$ from the outer regulator 82, as well as measured D-Q current signals $i_q$, $i_d$, to generate D-Q duty cycle command signals $D^*_q$, $D^*_d$. A DQ/ABC transformation module 86 receives the D-Q duty cycle command signals $D^*_q$, $D^*_d$ and phase angle θ. The DQ/ABC transformation module 86 converts the two-phase D-Q duty cycle command signals $D^*_q$, $D^*_d$ into three-phase quantities, generating a three-phase duty cycle signal $D^*_{abc}$.

Figure 12:
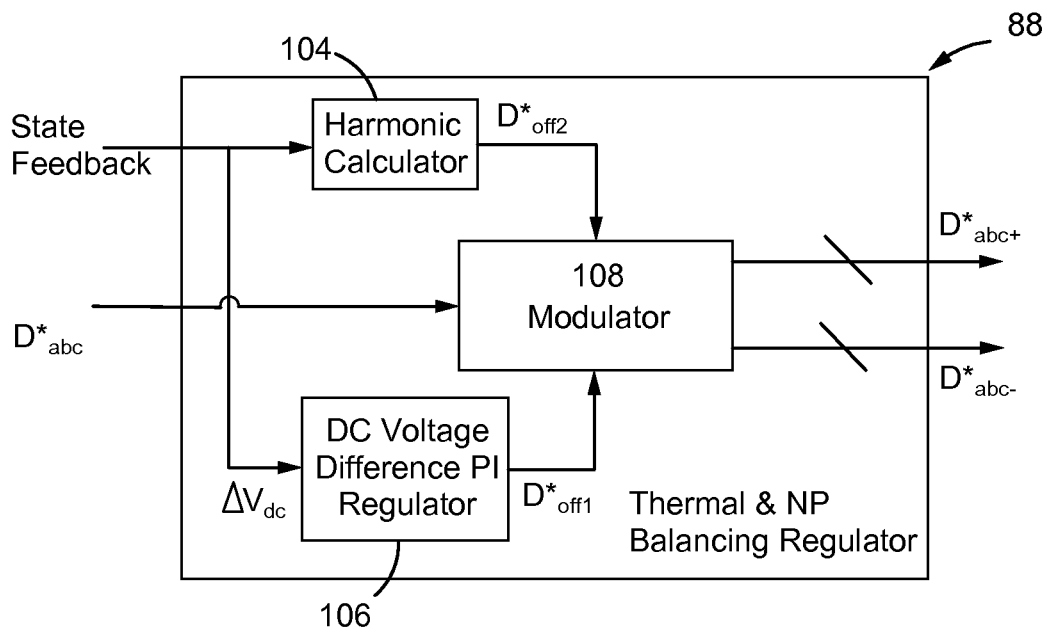
FIG. 12 is a schematic representation of a thermal and neutral point balancing regulator for the controller of FIG. 11, according to an exemplary embodiment of the present disclosure.

The three-phase duty cycle signal $D^*_{abc}$, and state feedback signals are fed into a thermal and neutral point (NP) balancing module 88. The thermal and NP balancing module 88 generates duty cycle signals $D^*_{abc+}$, $D^*_{abc-}$ for upper and lower arms of each phase of the motor that balance neutral point voltage and thermal stress in the converter 32 and/or inverter 34. More specifically, as shown in FIG. 12, the thermal and NP balancing module 88 may include the following modules: harmonic calculator 104, DC voltage difference proportional-integral (PI) regulator 106, and modulator 108.

The harmonic calculator 104 receives the state feedback signals. Based on the state feedback signals, the harmonic calculator 104 generates a duty cycle injection signal $D^*_{off2}$ that balances NP voltage of the converter 32 and/or inverter 34. In order to determine a value of duty cycle injection signal $D^*_{off2}$, the harmonic calculator 104 may be implemented using techniques such as, without limitation, a look-up table, linear equations, nonlinear equations, and the like.

A higher value for the duty cycle injection signal $D^*_{off2}$ indicates an increased injection applied to the converter 32 and/or inverter 34. Therefore, increased current flows through the outer IGBTs and diodes in the aforementioned topologies, while less current flows through the neutral point path. When output current is high and frequency is low, a higher value of $D^*_{off2}$ can be chosen. When the converter 32/inverter 34 has a decreased load, then a lower value of $D^*_{off2}$ may be appropriate for switching loss reduction. In so doing, the harmonic calculator 104 minimizes NP current in order to maintain a desired NP voltage of the inverter.

The state feedback signals may include a voltage difference between upper and lower DC buses 38, 39 of the converter 32/inverter 34. The voltage difference between the upper and lower DC buses 38, 39 is fed into the DC voltage difference PI regulator 106. The DC voltage difference PI regulator 106 generates duty cycle injection signal $D^*_{off1}$ that eliminates steady-state NP voltage unbalance and has slow dynamics in order to prevent instability. In so doing, the DC voltage difference PI regulator 106 generates duty cycle injection signal $D^*_{off1}$ that balances or relieves uneven thermal stress across the plurality of devices in the converter 32/inverter 34.

Together with the three-phase duty cycle signal $D^*_{abc}$, the duty cycle injection signals $D^*_{off1}$ and $D^*_{off2}$ from modules 104, 106 are fed into the modulator 108. The modulator 108 determines the duty cycles for the upper and lower arms of each phase of the motor, generating duty cycle signals $D^*_{abc+}$, $D^*_{abc-}$. In order to calculate the duty cycles for upper and lower arms of each phase leg, the modulator 108 may use the following formula:

$$D^*_i = D^*_{abc} + 0.5[\max(D^*_{abc}) + \min(D^*_{abc})]$$

$$D^*_{abc+} = 0.5(D^*_i - \min(D^*_i)) + D^*_{off1} + D^*_{off2} \text{ for upper arm}$$

$$D^*_{abc-} = |0.5(D^*_i - \max(D^*_i))| - D^*_{off1} + D^*_{off2} \text{ for lower arm}$$

where $D^*_i$ is a duty cycle reference signal, $D^*_{abc}$ is the three-phase duty cycle signal, $D^*_{abc+}$ is the duty cycle signal for the upper arm, $D^*_{abc-}$ is the duty cycle signal for the lower arm, $D^*_{off1}$ is the duty cycle injection signal from the DC voltage difference PI regulator 106, and $D^*_{off2}$ is the duty cycle injection signal from the harmonic calculator 104.

It is to be understood that the neutral point balancing algorithm from the DC voltage difference PI regulator 106 with output $D^*_{off1}$ and the thermal balancing algorithm from the harmonic calculator 104 with output $D^*_{off2}$ may be used independently with a variety of base pulse width modulation (PWM) techniques. For example, in another embodiment, the above equations may be modified, and the modulator 108 may use the following formula in order to calculate the duty cycles for upper and lower arms of each phase leg:

$$D^*_i = D^*_{abc} + 0.5[\max(D^*_{abc}) + \min(D^*_{abc})]$$

$$D^*_{abc+} = D^*_{i+} + D^*_{off1} + D^*_{off2} \text{ for upper arm}$$

$$D^*_{abc-} = D_{i-} - D^*_{off1} + D^*_{off2} \text{ for lower arm}$$

where $D^*_i$ is the duty cycle reference signal, $D^*_{abc}$ is the three-phase duty cycle signal, $D^*_{abc+}$ is the duty cycle signal for the upper arm, $D^*_{abc-}$ the duty cycle signal for the lower arm, $D^*_{off1}$ is the duty cycle injection signal from the DC voltage difference PI regulator 106, $D^*_{off2}$ is the duty cycle injection signal from the harmonic calculator 104, $D^*_{i+}$ is the positive side of the duty cycle corresponding to the i (=a, b, or c) phase, and $D^*_{i-}$ is the negative side of the duty cycle corresponding to the i (=a, b, or c) phase.

Other base PWM techniques that may be used include, but are not limited to, space vector PWM (SPWM), sin-triangle PWM with third harmonic injection, discontinuous PWM (DPWM) in which the switches are not switched during a period of large current in the alternating current waveform (e.g., inverter/converter), and the like.

Referring back to FIG. 11, a dead-time compensator 90 may receive the duty cycle signals $D^*_{abc+}$, $D^*_{abc-}$ from the thermal and neutral point (NP) balancing module 88. The dead-time compensator 90 may modify the duty cycle signals $D^*_{abc+}$, $D^*_{abc-}$ to compensate for dead-time, generating modified duty cycle signals $D^{}_{abc+}$, $D^{}_{abc-}$. Dead-time may be adopted to prevent shoot-through across the DC-link, as well as to guarantee a low voltage rate of change (dV/dt) stress at the alternating current (AC) terminals. Furthermore, application of proper dead-time compensation may prevent current distortion introduced by adopting dead-time. Dead-time compensation may be based on phase current direction, dead-time duration, and PWM frequency. The dead-time compensator 90 may determine dead-time compensation for each phase leg using the following formula:

$$\Delta D^*_{comp} = -\text{sine}(i) \times T_{DT} \times F_s$$

$$D^{**}_{abc+} = D^*_{abc+} + \Delta D^*_{comp} \text{ for upper arm}$$

$$D^{**}_{abc-} = D^*_{abc-} - \Delta D^*_{comp} \text{ for lower arm}$$

where $\Delta D^*_{comp}$ is the dead-time compensation, i is the phase current direction, $T_{DT}$ is the dead-time duration, $F_s$ is the PWM frequency, $D^*_{abc+}$ is the duty cycle signal for the upper arm, $D^*_{abc-}$ is the duty cycle signal for the lower arm, $D^{}_{abc+}$ is the modified duty signal for the upper arm, and $D^{}_{abc-}$ is the modified duty signal for the lower arm.

Figure 13:
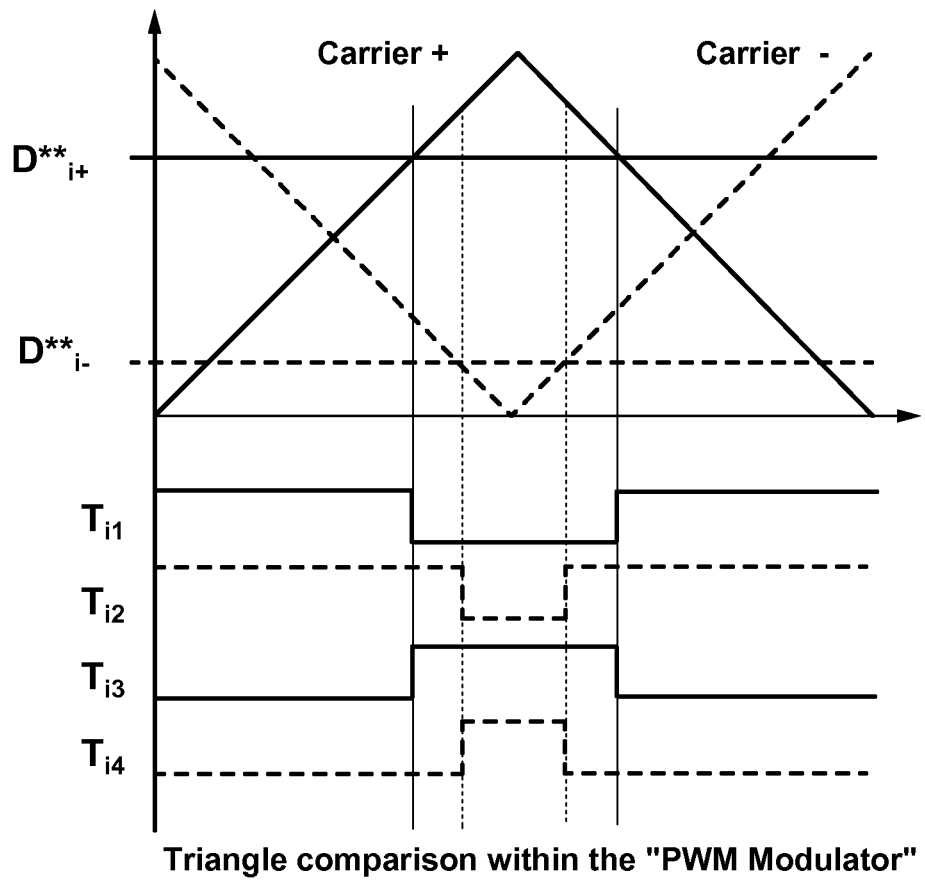
FIG. 13 is a diagram of a triangle comparison within a PWM modulator for the controller of FIG. 11, according to an exemplary embodiment of the present disclosure.

A PWM modulator 92 may receive the modified duty signals $D^{}_{abc+}$, $D^{}_{abc-}$ for triangle comparison. Triangle comparison controls semiconductor devices in the power circuit and may be implemented in the PWM modulator 92, as illustrated in FIG. 13. There may be one comparator for each phase leg in the PWM modulator 92 that receives the modified positive and negative duty cycle signals $D^{}_{i+}$, $D^{}_{i-}$ for (i=a, b, c). The comparator may then output logic signals $T_{i1}$~$T_{i4}$ which control corresponding IGBTs (FIGS. 2-7) in the converter/inverter (where 1=turn on and 0=turn off). The modified positive and negative duty cycle signals $D^{}_{i+}$, $D^{}_{i-}$ from the modulators are compared with two carriers Carrier+, Carrier−, respectively. The two carriers Carrier+, Carrier− are phase-shifted by one hundred eighty degrees (180°). The logic calculations are shown below:

If $D^*_{i+} \geq$ Carrier+, then $T_{i1}=1$, $T_{i3}=0$; else $T_{i1}=0$, $T_{i3}=1$ If $D^*_{i-} \geq$ Carrier−, then $T_{i4}=1$, $T_{i2}=0$; else $T_{i4}=0$, $T_{i2}=1$ where $D^*_{i-}$ is the negative side of the duty cycle corresponding to the i(=a, b, or c) phase, $D^*i_-$ is the positive side of the duty cycle corresponding to the i(=a, b, or c) phase, Carrier+ is the positive side of the carrier, Carrier− is the negative side of the carrier, and $T_{i1}$~$T_{i4}$ are the output logic signals controlling corresponding IGBTs in FIGS. 2-7.

Figure 14:
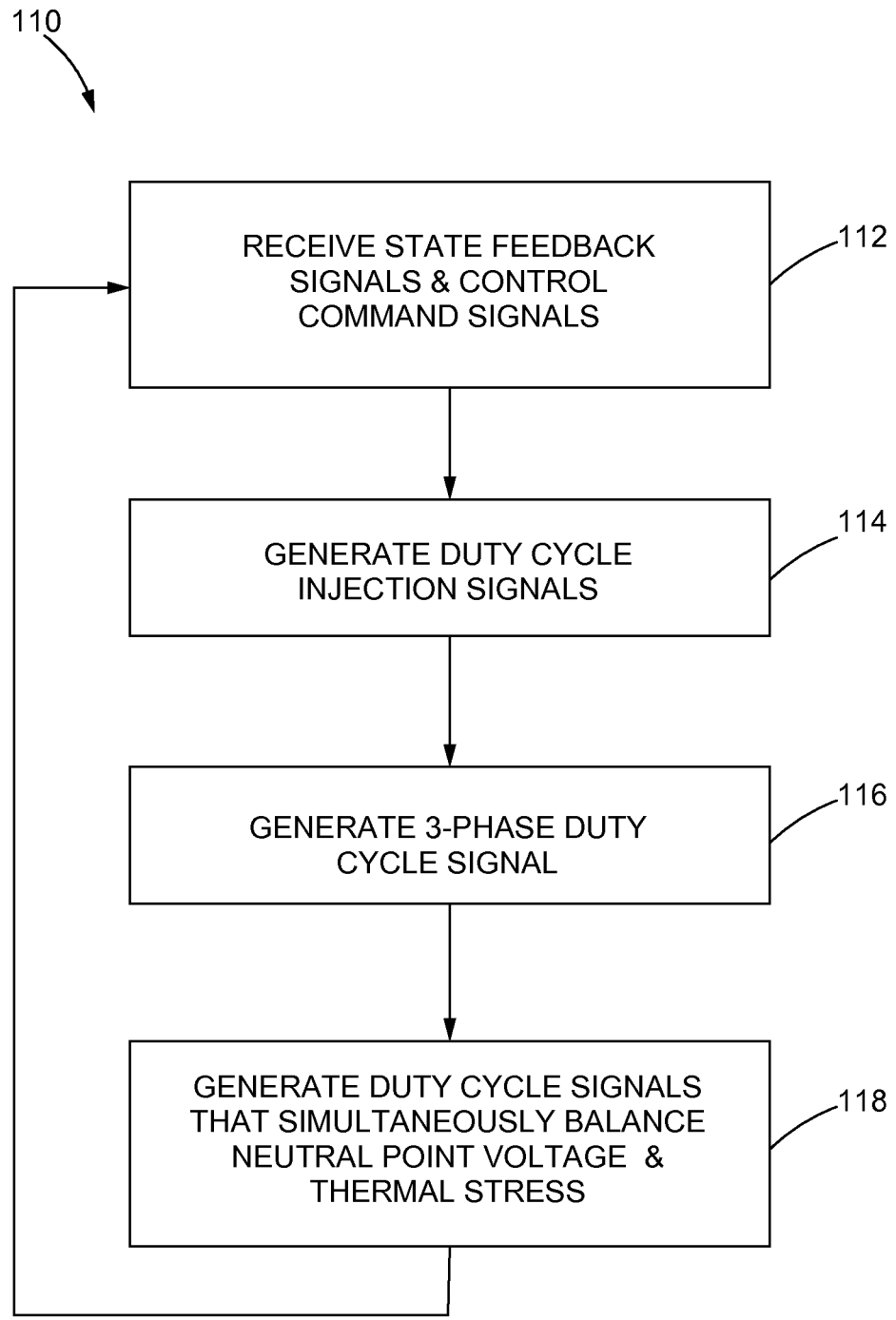
FIG. 14 is a flowchart illustrating an exemplary process for controlling an inverter or converter, according to another exemplary embodiment.

Turning now to FIG. 14, with continued reference to FIGS. 1-13, an exemplary process 110 for controlling the converter 32 and/or the inverter 34 coupled to the motor 28 is shown. At block 112, the controller 54 may receive state feedback signals and control command signals. The controller 54 may generate duty cycle injection signals $D^*_{off1}$, $D^*_{off2}$ based at least in part on the state feedback signals, at block 114. At block 116, the controller 54 may generate the three-phase duty cycle signal $D^*_{abc}$ based at least in part on the control command signals. At block 118, the controller 54 may generate duty cycle signals $D^*_{abc+}$, $D^*_{abc-}$ for upper and lower arms of each phase of the motor 28. The duty cycle signals $D^*_{abc+}$, $D^*_{abc-}$ may be based at least in part on the duty cycle injection signals $D^*_{off1}$, $D^*_{off2}$ and the three-phase duty cycle signal $D^*_{abc}$. Furthermore, the duty cycle signals $D^*_{abc+}$, $D^*_{abc-}$ balance neutral point voltage and thermal stress in the converter 32/inverter 34.

Figure 4:
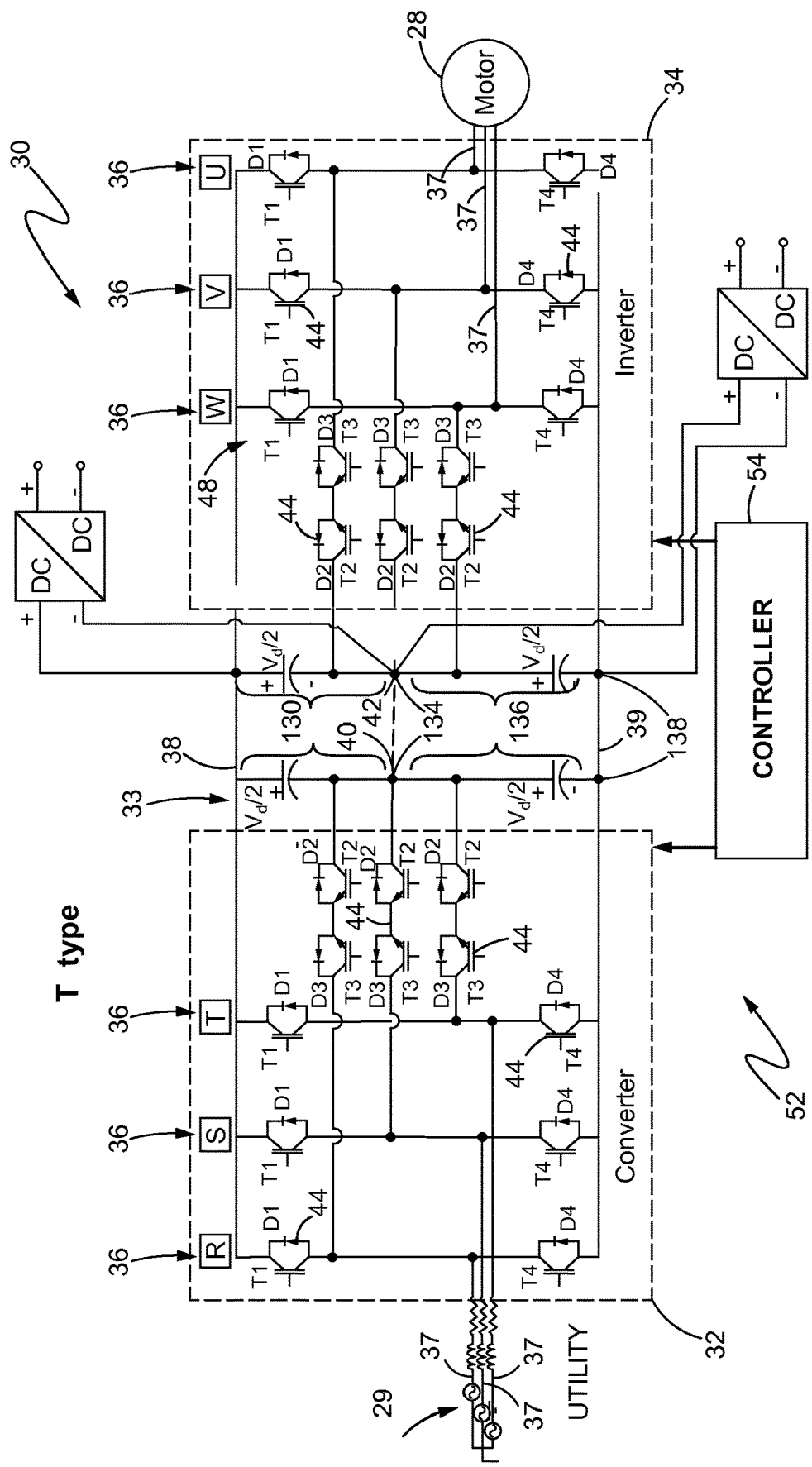
FIG. 4 is a schematic representation of a T-type regenerative drive for the elevator system of FIG. 1, according to an exemplary embodiment of the present disclosure.
Figure 6:
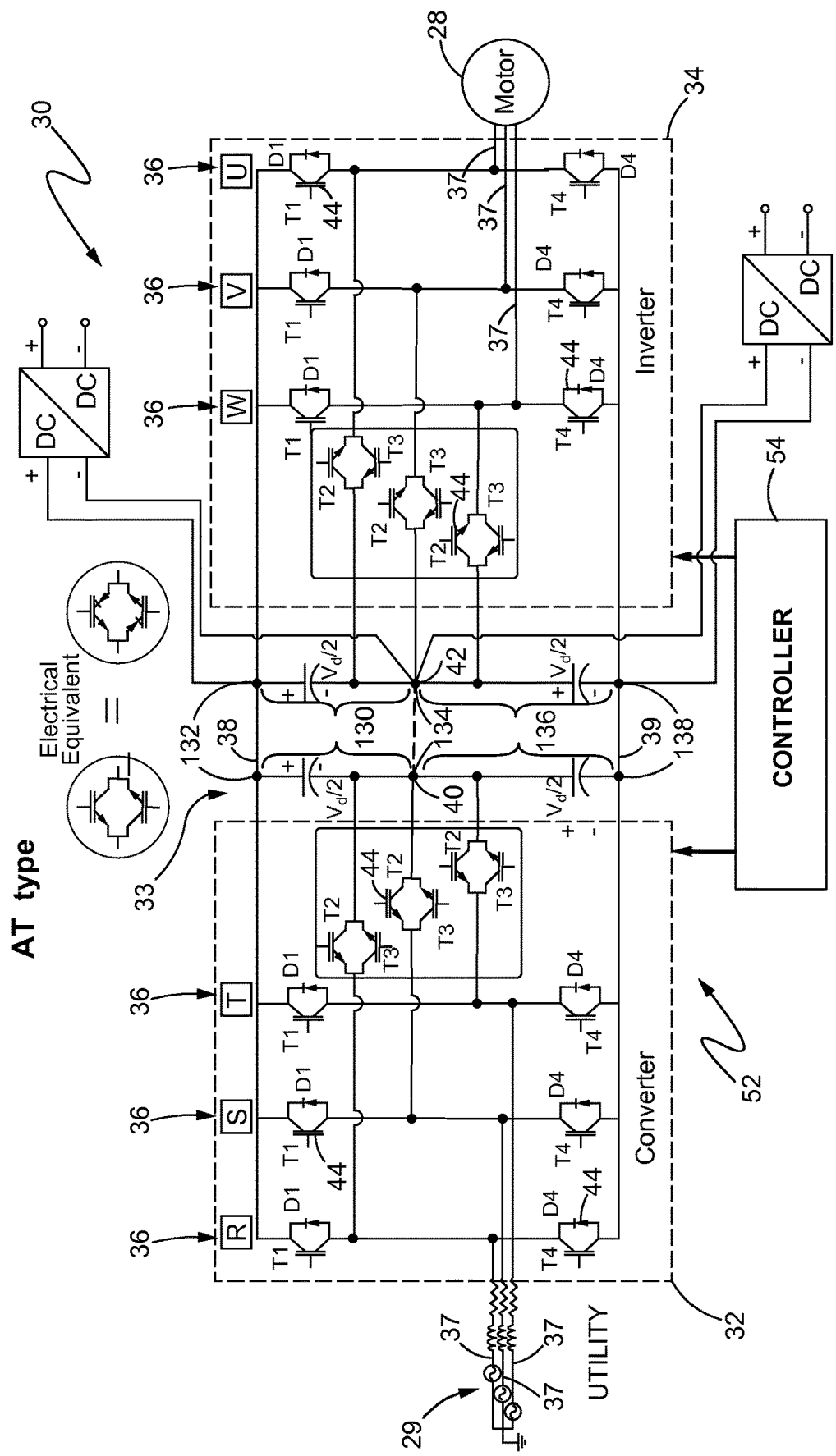
FIG. 6 is a schematic representation of a reverse-blocking insulated gate bipolar transistor (IGBT) based regenerative drive for the elevator system of FIG. 1, according to an exemplary embodiment of the present disclosure.
Figure 21:
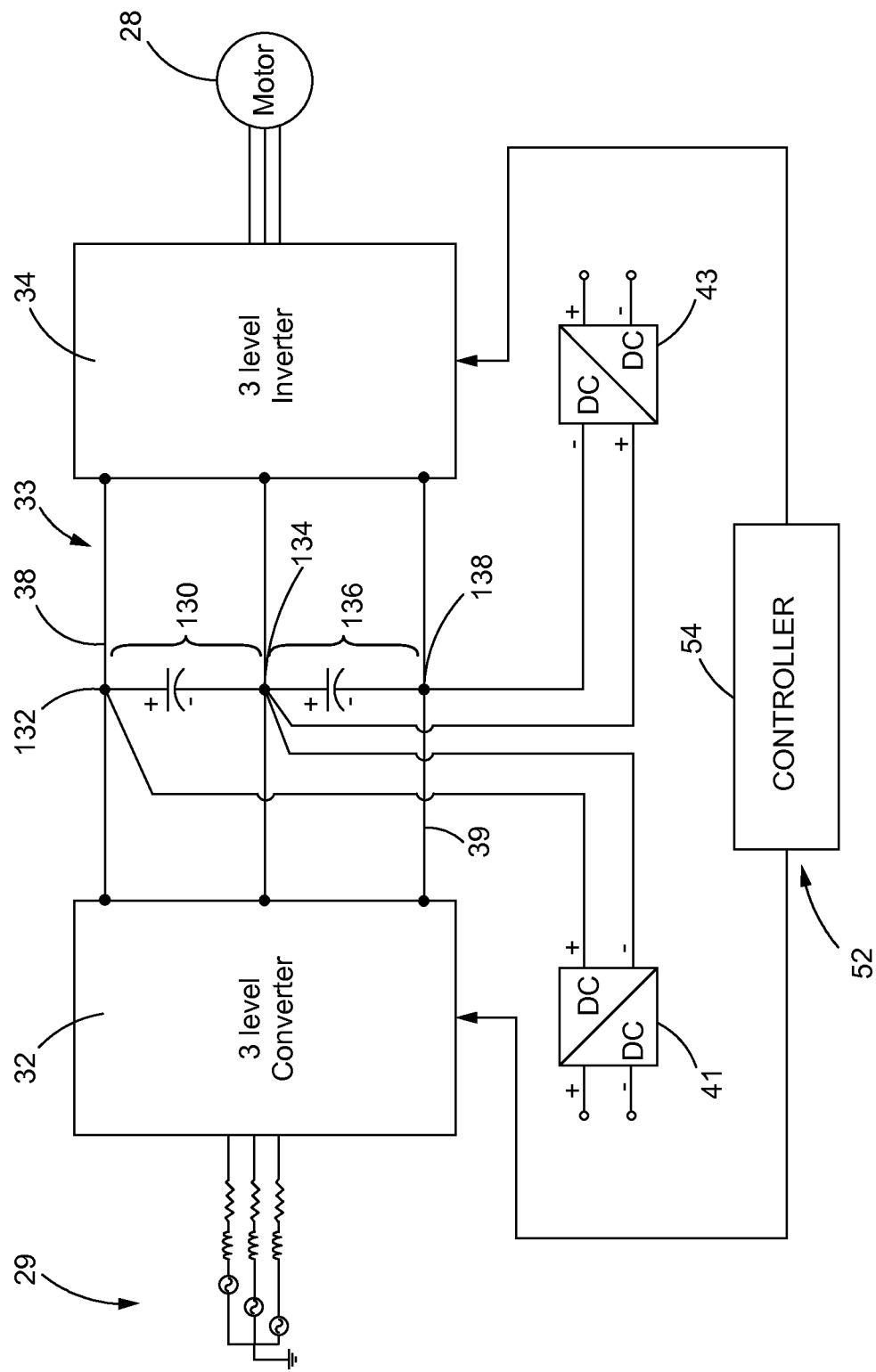
FIG. 21 is a schematic representation illustrating an auxiliary power supply connected across the upper portion of the DC bus between the positive terminal and the neutral point, and an auxiliary power supply connected across the lower portion of the DC bus between the neutral point and the negative terminal.

Turning now to FIGS. 2, 4 and 6, in the embodiments shown therein, an auxiliary power supply 41 may be connected across the upper portion 130 of the DC bus 33 between the positive terminal 132 and the neutral point 134, and an auxiliary power supply 43 may be connected across the lower portion 136 of the DC bus 33 between the neutral point 134 and the negative terminal 138. FIG. 21 shows a simplified circuit diagram illustrating an auxiliary power supply 41 connected across the upper portion 130 of the DC bus 33 between the positive terminal 132 and the neutral point 134, and an auxiliary power supply 43 connected across the lower portion 136 of the DC bus 33 between the neutral point 134 and the negative terminal 138.

Unbalanced voltage created due to uneven power drawn from the upper and lower portions 130, 136 of the DC link is mitigated via active measurement of the voltages across each of the upper and lower portions 130, 136 of the DC link in connection with the application of bipolar modulation. More specifically, modulation (for example, bipolar modulation) is applied that uses the difference in voltage between the upper and lower portions 130, 136 of the DC link to inject the correct amount of current (in view of the aforementioned difference in voltage) into the neutral point 134 in order to keep the upper and lower portions 130, 136 of the DC link balanced.

Utilizing topologies such as those depicted in the FIGS. 2, 4, 6, and 21 and the methodology described herein for neutral point balancing allows auxiliary power supplies 41, 43 that have lower input voltage ratings (than would otherwise be needed) to be connected to the upper and lower portions 130, 136 of the DC bus 33 because each auxiliary power supply 41, 43 is supplied with only about half of the voltage as that seen across the entire DC bus (positive terminal 132 to negative terminal 138). Furthermore, the components connected to these auxiliary power supplies 41, 43 do not have to be rated for the entire voltage drop across the DC bus 33 (from positive terminal 132 to negative terminal 138). This allows use of electrical components (connected to the power supplies 41, 43) that have lower voltage ratings than would otherwise be needed (in the absence of the splitting of the DC link across the DC bus 33 in conjunction with the disclosed methodology to maintain the neutral point 134 at about half of the full DC bus voltage). Such lower rated components tend to be standardized and less costly. Referencing each auxiliary power supply 41, 43 to the middle of the DC bus 33 also reduces the isolation requirements of each auxiliary power supply 41, 43. Additionally, the auxiliary power supplies 41, 43 can serve the dual purpose of discharging each half of the DC bus 33 when the regenerative drive is turned off, thereby replacing balancing resistors that can be expensive and add unnecessary losses to the system.

INDUSTRIAL APPLICABILITY

From the foregoing, it can be seen that the teachings of this disclosure can find industrial or commercial applications, such as, including but not limited to, control systems for regenerative drives. Such control systems may be used, for example, in traction applications, such as, including but not limited to, elevator systems.

The disclosed control system and method applies unipolar and bipolar modulation to the converter and the inverter in order to achieve certain benefits in the elevator system. Unipolar modulation applied to the converter and/or inverter provides for improved efficiency and decreased ripple/acoustic noise, which enhances the elevator system's acoustic performance. Bipolar modulation applied to the converter and/or inverter provides for re-distribution of thermal heat across the devices, or thermal balancing, which thereby results in a longer part life of the regenerative drive. In addition, bipolar modulation allows for tighter neutral voltage control, which improves ride quality of the elevator system.

The disclosed modulation formulae for the control system and method are convenient for implementation in digital controllers. Using the disclosed modulation formulae it is possible to control the neutral point current in order to balance the neutral point voltage, thereby minimizing the DC-link capacitance requirement. At the same time, the thermal stress in the converter/inverter can be distributed evenly among all the devices, which translates into a significant increase in the inverter power throughput and a substantial enhancement in the expected device lifetime.

The disclosed controller conveniently manages thermal stress of the devices because the disclosed modulation techniques are related to only one control variable (duty cycle injection signal $D^*_{off2}$) and the control logic is straightforward. Furthermore, the disclosed thermal balancing modulation technique allows for continuous variation of the control variable (duty cycle injection signal $D^*_{off2}$), thereby eliminating the need to switch back and forth between the neutral point balancing PWM and bipolar PWM and improving voltage total harmonic distortion.

Figure 15:
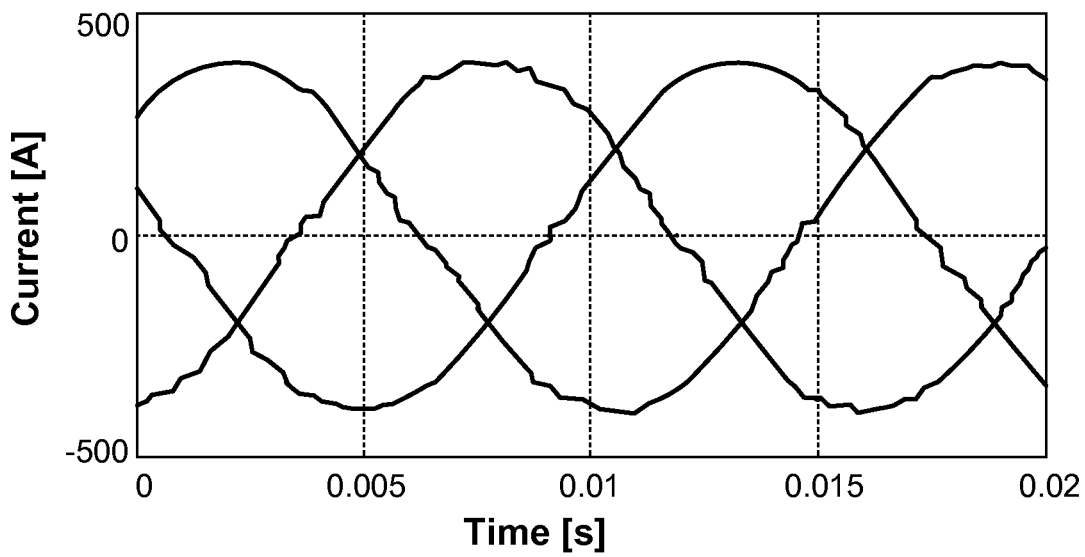
FIG. 15 is a graph of a current waveform of the prior art illustrating current distortion due to dead-time effects.
Figure 16:
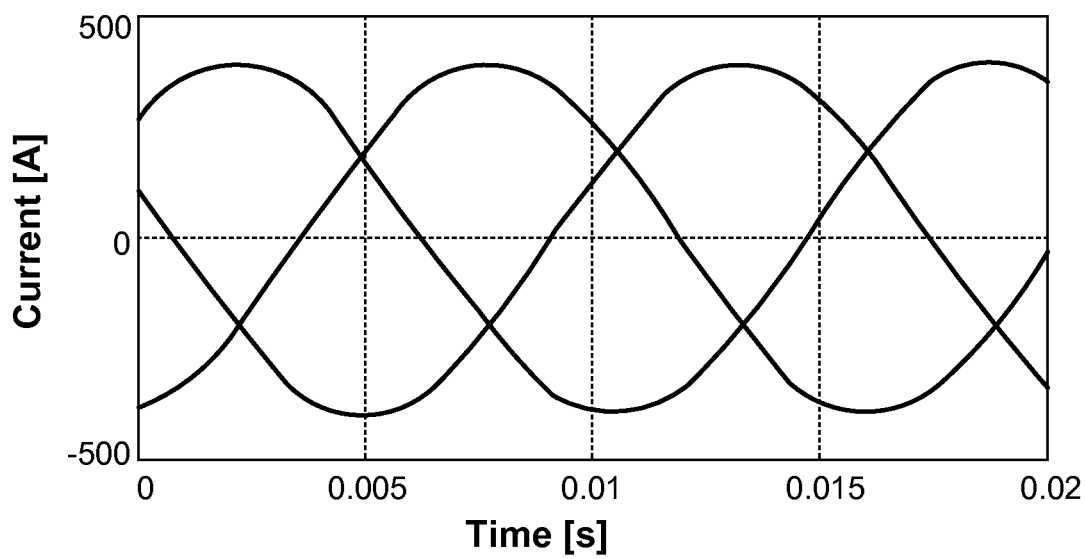
FIG. 16 is a graph of a current waveform with dead-time compensation using modulation techniques of the present disclosure.
Figure 17:
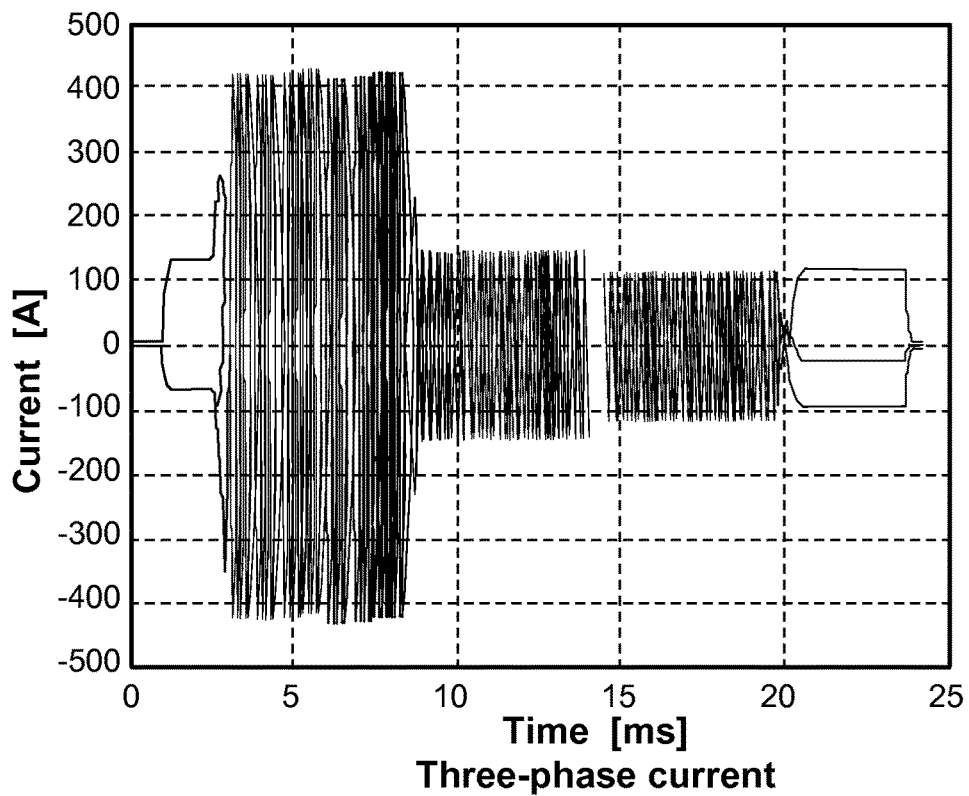
FIG. 17 is a graph showing simulation results of three-phase current of the prior art.

Moreover, the disclosed modulation techniques include dead-time compensation. Compared to the prior art current waveform shown in FIG. 15, the dead-time compensation of the present disclosure improves the current distortion due to dead-time effects, as shown in FIG. 16.

Figure 18:
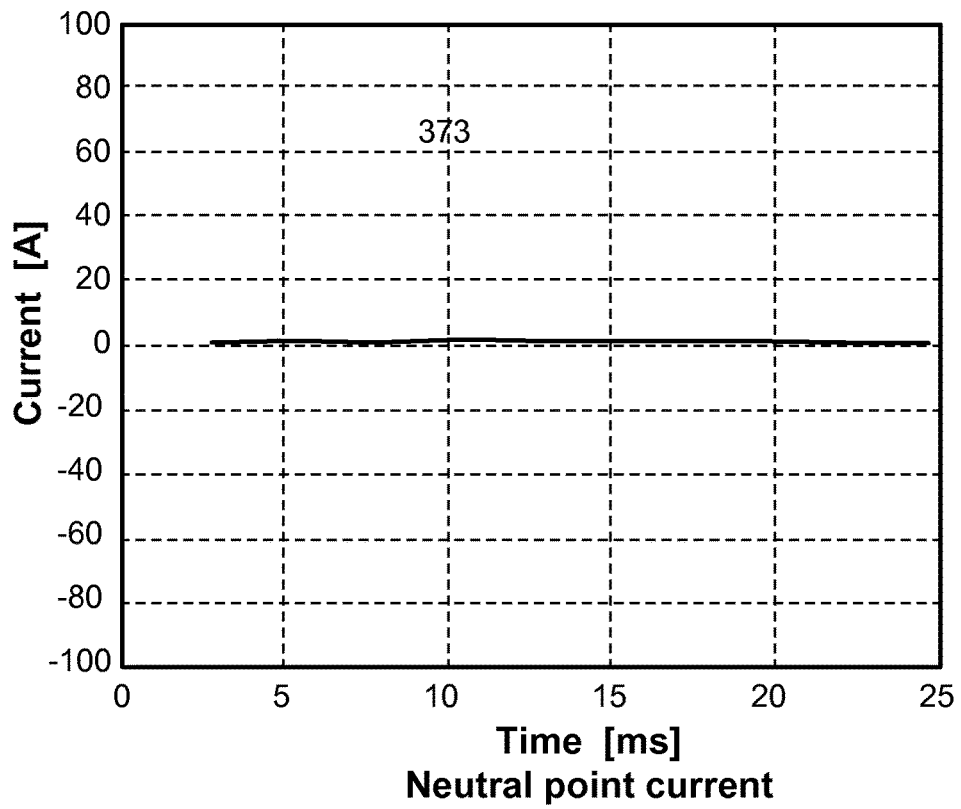
FIG. 18 is a graph showing simulation results of neutral point current using modulation techniques of the present disclosure.
Figure 19:
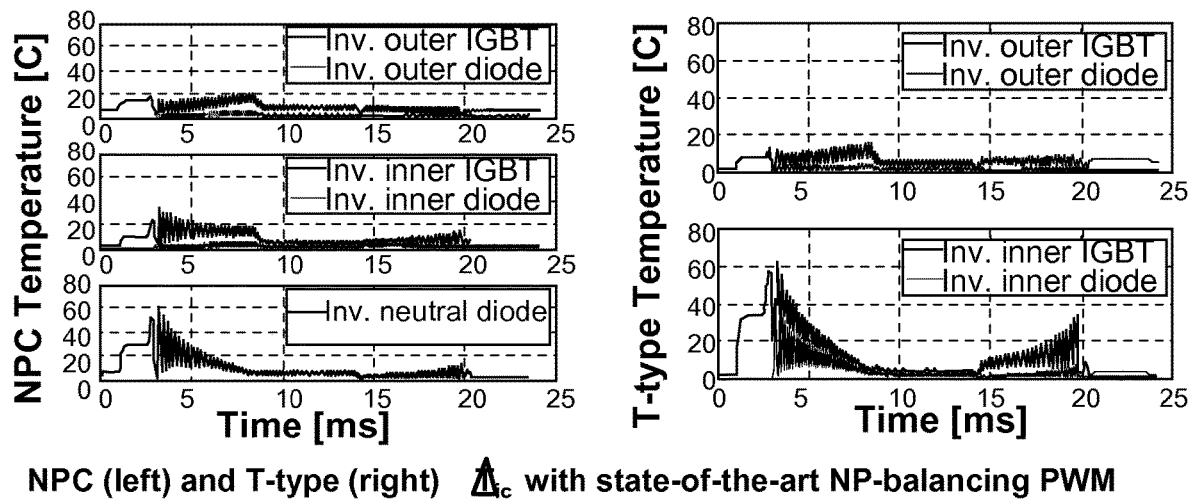
FIG. 19 is a graph showing simulation results for a maximum device j-c temperature rise $\Delta T_{jc}$ in both NPC and T-type topologies of the prior art.
Figure 20:
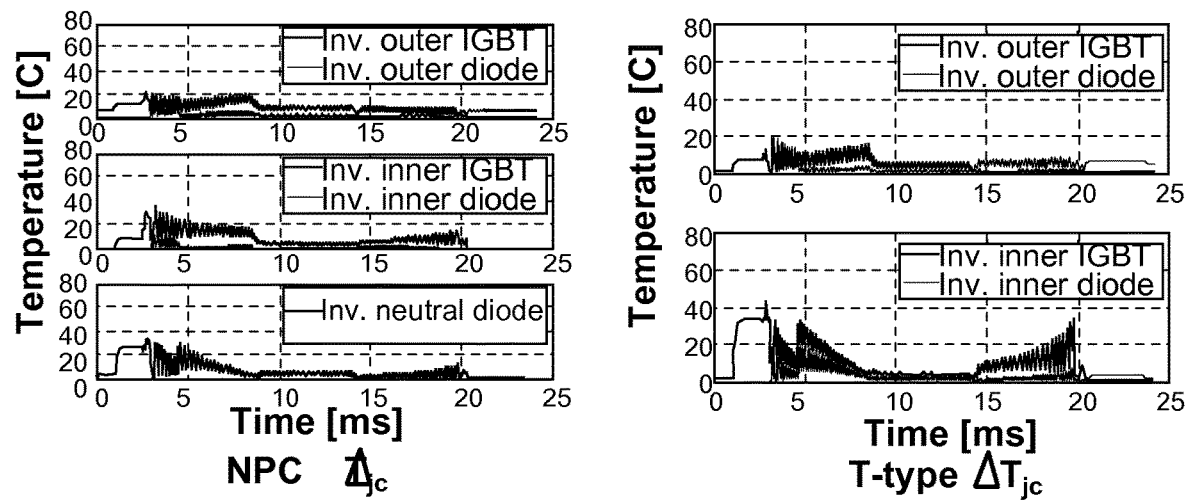
FIG. 20 is a graph showing simulation results for a maximum device j-c temperature rise $\Delta T_{jc}$ in both NPC and T-type topologies using modulation techniques according to various exemplary embodiments of the present disclosure.

The modulation techniques disclosed herein can be used, for example, in NPC, T-type and reverse-blocking IGBT topologies for three-level converters and/or three-level inverters. FIGS. 17-20 depict simulation results of the disclosed modulation techniques compared to the prior art. Compared to the prior art results in FIG. 17, neutral point current is significantly minimized using the disclosed modulation techniques, as shown in FIG. 18. Compared to the prior art results in FIG. 19, the maximum device j-c temperature rise $\Delta T_{jc}$ is also significantly reduced using the disclosed modulation techniques, as shown in FIG. 20. In addition, the benefits of the disclosed techniques are achieved without using higher rating devices or adding extra circuit components, and the increased computational power required to fulfill the described techniques is minimal.

The topologies and modulation techniques disclosed herein allow the generation of duty cycle signals for the upper and lower arms of each phase of the converter 32/inverter 34 that maintain the neutral point current at about zero amperes at the neutral point 134. This maintains about half of the total DC bus voltage across the upper portion 130 and about half of the total DC bus voltage across the lower portion 136 of the DC bus 33; even when the upper and lower portions 130, 136 of the DC bus 33 are unevenly loaded.

While the foregoing detailed description has been given and provided with respect to certain specific embodiments, it is to be understood that the scope of the disclosure should not be limited to such embodiments, and that the same are provided simply for enablement and best mode purposes. The breadth and spirit of the present disclosure is broader than the embodiments specifically disclosed and encompassed within the claims appended hereto. It is understood that features described with relation to a specific embodiment may be used with alternate embodiments where practicable.

What is claimed is:

1. A method for providing power from a multilevel regenerative drive to at least one auxiliary power supply, the multilevel regenerative drive including a converter including a phase leg having a plurality of converter transistors, operatively connected to an inverter through a DC bus having an upper portion defined by a positive terminal and a neutral point and a lower portion defined by the neutral point and a negative terminal, the inverter including a phase leg having a plurality of inverter transistors coupled to a motor, the DC bus having an output voltage, the method comprising:
   generating duty cycle signals for upper and lower arms of each phase of the motor that maintain a neutral point current at about zero amperes at the neutral point; and
   providing about half of the output voltage across the upper portion of the DC bus and about half of the output voltage across the lower portion of the DC bus, when the upper and lower portions of the DC bus are unevenly loaded, wherein a first auxiliary power supply is connected to one of the upper and lower portions of the DC bus and receives power from the multilevel regenerative drive;
   applying at least one of unipolar modulation and bipolar modulation to the converter wherein bipolar modulation of the converter includes switching all the converter transistors and unipolar modulation of the converter includes switching less then all the converter transistors; and
   applying at least one of unipolar modulation and bipolar modulation to the inverter, wherein bipolar modulation of the inverter includes switching all the inverter transistors and unipolar modulation of the inverter includes switching less then all the inverter transistors.

2. The method of claim 1, wherein a second auxiliary power supply is connected to the other of the upper and lower portions of the DC bus and receives power from the multilevel regenerative drive.

3. The method of claim 1, wherein the applying at least one of unipolar modulation and bipolar modulation to the converter comprises applying unipolar modulation to the converter.

4. The method of claim 1, wherein the applying at least one of unipolar modulation and bipolar modulation to the converter comprises applying bipolar modulation to the converter.

5. The method of claim 3, wherein the applying at least one of unipolar modulation and bipolar modulation to the inverter comprises applying bipolar modulation to the inverter.

6. The method of claim 3, wherein the applying at least one of unipolar modulation and bipolar modulation to the inverter comprises applying bipolar modulation to the inverter during a first period, and applying unipolar modulation to the inverter during a second period, wherein the first period may precede or follow the second period.

7. The method of claim 3, wherein the applying at least one of unipolar modulation and bipolar modulation to the inverter comprises applying bipolar modulation to the inverter during acceleration and applying unipolar modulation to the inverter during constant velocity.

8. A system for providing power from a mechanical system having a motor to at least one auxiliary power supply, comprising:
   a converter operatively connected to a power source, the converter including a phase leg having a plurality of converter transistors;
   a DC bus having an upper portion defined by a positive terminal and a neutral point, and a lower portion defined by the neutral point and a negative terminal;
   an inverter operatively connected to the motor of the mechanical system the inverter and the converter operatively connected through the DC bus, the inverter including a phase leg having a plurality of inverter transistors; and
   at least one controller in communication with the converter and the inverter, the at least one controller configured to provide about half of the output voltage across the upper portion of the DC bus and about half of the output voltage across the lower portion of the DC bus when the upper and lower portions of the DC bus are unevenly loaded, wherein a first auxiliary power supply is connected to and receives power from one of the upper and lower portions of the DC bus;
   wherein the at least one controller is further configured to apply at least one of unipolar modulation and bipolar modulation to the converter, wherein bipolar modulation of the converter includes switching all the converter transistors and unipolar modulation of the converter includes switching less then all the converter transistors and
   apply at least one of unipolar modulation and bipolar modulation to the inverter wherein bipolar modulation of the inverter includes switching all the inverter transistors and unipolar modulation of the inverter includes switching less then all the inverter transistors.

9. The system of claim 8, wherein a second auxiliary power supply is connected to and receives power from the other of the upper and lower portions of the DC bus.

10. The system of claim 8, wherein the at least one controller is further configured to apply unipolar modulation to the converter and apply bipolar modulation to the inverter.

11. The system of claim 8, wherein the at least one controller is further configured to apply unipolar modulation to the converter, and apply both unipolar and bipolar modulation to the inverter.

12. The system of claim 8, wherein the at least one controller is further configured to apply bipolar modulation to the converter and apply bipolar modulation to the inverter.

13. The system of claim 8, wherein the converter and the inverter have a neutral-point-clamped, T-type, or reverse blocking insulated gate bipolar transistor based topology.

14. The system of claim 8, wherein the mechanical system is an elevator system.

15. An elevator system connected to at least one auxiliary power supply (41, 43), comprising:
- an elevator car disposed in a hoistway;
- a motor operatively connected to the elevator car, the motor generating a thrust force to move the elevator car within the hoistway;
- a power source operatively connected to the motor, the power source supplying power to the motor;
- a converter operatively connected to the power source, the converter including a phase leg having a plurality of converter transistors;
- a DC bus having an upper portion defined by a positive terminal and a neutral point, and a lower portion defined by the neutral point and a negative terminal;
- an inverter operatively connected to the motor, the inverter and the converter operatively connected through the DC bus, and the inverter including a phase leg having a plurality of converter transistors having a plurality of transistors; and
- at least one controller in communication with the converter and the inverter, the at least one controller being configured to selectively apply pulse width modulation to the converter and the inverter in at least one of a unipolar mode and a bipolar mode, the at least one controller further configured to provide about half of the output voltage across the upper portion of the DC bus and about half of the output voltage across the lower portion of the DC bus, when the upper and lower portions of the DC bus are unevenly loaded, wherein a first auxiliary power supply is connected to and receives power from one of the upper and lower portions of the DC bus;
- wherein bipolar modulation of the converter includes switching all the converter transistors and unipolar modulation of the converter includes switching less then all the converter transistors;
- wherein bipolar modulation of the inverter includes switching all the inverter transistors and unipolar modulation of the inverter includes switching less then all the inverter transistors.

16. The elevator system of claim 15, wherein a second auxiliary power supply is connected to and receives power from the other of the upper and lower portions of the DC bus.

17. The elevator system of claim 15, wherein the controller is further configured to apply unipolar modulation to the converter, while simultaneously applying bipolar modulation to the inverter.

18. The elevator system of claim 15, wherein the at least one controller is further configured to apply unipolar modulation to the converter, while simultaneously applying bipolar modulation to the inverter during acceleration of the elevator car and unipolar modulation to the inverter during constant speed.

* * * * *